UNITED STATES PATENT OFFICE.

HERSCHEL C. PARKER, OF NEW YORK, N. Y., ASSIGNOR TO PARKER-CLARK ELECTRIC COMPANY, OF JERSEY CITY, NEW JERSEY, A CORPORATION OF NEW JERSEY.

ART OF PRODUCING METALLIC IRIDIUM.

No 805,316. Specification of Letters Patent. Patented Nov. 21, 1905.

Application filed June 21, 1905. Serial No. 266,224.

*To all whom it may concern:*

Be it known that I, HERSCHEL C. PARKER, of New York, county of Kings, and State of New York, have invented a new and useful Improvement in the Art of Producing Metallic Iridium, of which the following is a full, clear, and exact description.

My invention relates to improvements in the art of producing iridium in a metallic state, and especially to improvements which enable the iridium to be deposited in the form of a metallic film upon certain surfaces, and particularly on the surface of refractory and transparent materials—such, for instance, as quartz. In a general way my process is similar to that described in my application for Letters Patent of the United States for a process of making incandescent electric lamps, Serial No. 254,588, filed April 8, 1905.

It is well known that most attempts to produce iridium result in leaving it in the form of a powder or incoherent mass. I have found, however, that by taking iridium-powder, especially in the form of iridium-ammonium chlorid, and mixing this with ammonium chlorid, so as to form an excess of the ammonia compound, and then subjecting the mixture to high heat while it is in contact with a refractory substance the iridium is deposited in the form of a metal on the said refractory substance, and the other constituents of the mixture, being volatile, pass off. In carrying out this process it is obvious that I can produce the film in mirror form on a tube or sheet and that the iridium can be removed from the tube or sheet for other purposes. It will be seen, then, that I am able, first, to make a splendid metallic mirror, and, second, that I can produce iridium in a metallic state capable of being used for wire, metal sheets, or any desired form.

With these ends in view my invention consists of an improvement in the art of producing iridium in a metallic state, which improvement will be hereinafter described and claimed.

I take, first, iridium-ammonium chlorid, the formula of which is probably

$$IrCl_3 2NH_4Cl.$$

With this I mix an equal volume of ammonium chlorid, or the mixture may be in the ratio of three parts to two of the iridium-ammonium chlorid, or it can be varied, more or less, according to the effect desired and the amount of heat to be used. The hardness and thickness of the film to be deposited is governed somewhat by the amount of excess of ammonium chlorid in the mixture. If the film is to be produced on a tube, I pack the above mixture snugly in the tube to be coated and then the flame of a small blast-lamp is directed upon the tube, the flame being directed progressively along the tube, and the heat causes the volatile parts of the mixture to be driven off, while the iridium in metallic form is deposited on the inner wall of the tube. I have used the heat of the lamp with good effect; but it will of course be understood that the heat may be applied in other ways without affecting the invention, and it is also likely that other volatile substances—like ammonium carbonate, for instance—might be substituted for the ammonium chlorid; but the essential thing is to have a volatile substance which has a reducing action.

In my experiments I have had the mixture substantially as given in the formula; but I do not wish to confine my invention to these proportions or to the precise mixture given. If the iridium is to be produced on a plate, the mixture is as stated above, and the plate or sheet on which the powder is placed is heated, with the effect already stated. Also it will be understood that the mixture can be confined between walls of any configuration or shape and heated, with the effect of producing the metallic iridium and depositing it on the adjacent walls.

Having thus fully described my invention, I claim as new and desire to secure by Letters Patent—

1. The herein-described improvement in the art of producing metallic iridium, which consists in mixing the iridium compound in powder form with a reducing agent, placing the powder on a refractory substance and then heating the substance so as to drive off the volatile matter and leave the metallic iridium on the refractory material.

2. The improvement in the art of producing metallic iridium which consists in mixing compounds of iridium chlorin and ammonium with an ammonium compound and then heating the mixture whereby the volatile matter is driven off and the iridium deposited in a coherent metallic form.

3. The improvement in the art of producing metallic iridium which consists in mixing compounds of iridium chlorin and ammonium with an excess of ammonium chlorid and then subjecting the mixture to heat whereby the volatile matter is driven off and coherent metallic iridium is deposited.

4. The improvement in the art of producing metallic iridium which consists in subjecting an iridium compound to a high heat in the presence of an ammonium compound whereby the volatile matter is driven off and coherent metallic iridium in sheet form is deposited.

5. The herein-described improvement in the art of producing metallic iridium which consists in mingling compounds of iridium ammonium and chlorin with an ammonium compound and then subjecting the mass to sufficient heat to drive off the volatile matter thereby depositing coherent metallic iridium.

6. The herein-described improvement in the art of producing metallic iridium which consists in mingling iridium - ammonium chlorid with a volatile reducing agent, confining the mass in a refractory substance, and then heating said refractory substance, thus driving off the volatile matter and depositing the iridium in metallic form.

HERSCHEL C. PARKER.

Witnesses:
WARREN B. HUTCHINSON,
J. C. BANTA.